(12) United States Patent
Brooks et al.

(10) Patent No.: US 12,184,789 B2
(45) Date of Patent: Dec. 31, 2024

(54) BLOCKCHAIN BASED CERTIFICATE PINNING

(71) Applicant: VMware, Inc., Palo Alto, CA (US)

(72) Inventors: Simon Brooks, Napa, CA (US); Stephen Louis Turner, Atlanta, GA (US); Daniel Ochoa, Colorado Springs, CO (US)

(73) Assignee: Omnissa, LLC, Mountain View, CA (US)

( * ) Notice: Subject to any disclaimer, the term of this patent is extended or adjusted under 35 U.S.C. 154(b) by 388 days.

(21) Appl. No.: 17/578,198

(22) Filed: Jan. 18, 2022

(65) Prior Publication Data

US 2023/0231724 A1 Jul. 20, 2023

(51) Int. Cl.
*H04L 9/32* (2006.01)
*G06Q 20/36* (2012.01)
*H04L 9/08* (2006.01)
*H04L 9/00* (2022.01)

(52) U.S. Cl.
CPC ....... *H04L 9/3247* (2013.01); *G06Q 20/3674* (2013.01); *H04L 9/0825* (2013.01); *H04L 9/3236* (2013.01); *H04L 9/3263* (2013.01); *H04L 9/50* (2022.05); *H04L 2209/56* (2013.01)

(58) Field of Classification Search
None
See application file for complete search history.

(56) References Cited

U.S. PATENT DOCUMENTS

2018/0183587 A1* 6/2018 Won ............... H04L 63/166
2018/0367530 A1* 12/2018 Mistry ............ H04L 63/0823
2022/0150077 A1* 5/2022 Kim ................ H04L 9/3247

\* cited by examiner

*Primary Examiner* — Syed A Roni
(74) *Attorney, Agent, or Firm* — Kim & Stewart LLP

(57) ABSTRACT

Disclosed are various embodiments for replacing hard-coded certificate pinning with blockchain based certificate pinning. A signing device can obtain a public key from an endpoint device, produce a signature for the public key, and store the public key on a distributed data store, such as a blockchain. A client device can obtain and validate the public keys from the distributed data store and use the public keys to establish a secure connection between the client device and the endpoint device.

15 Claims, 8 Drawing Sheets

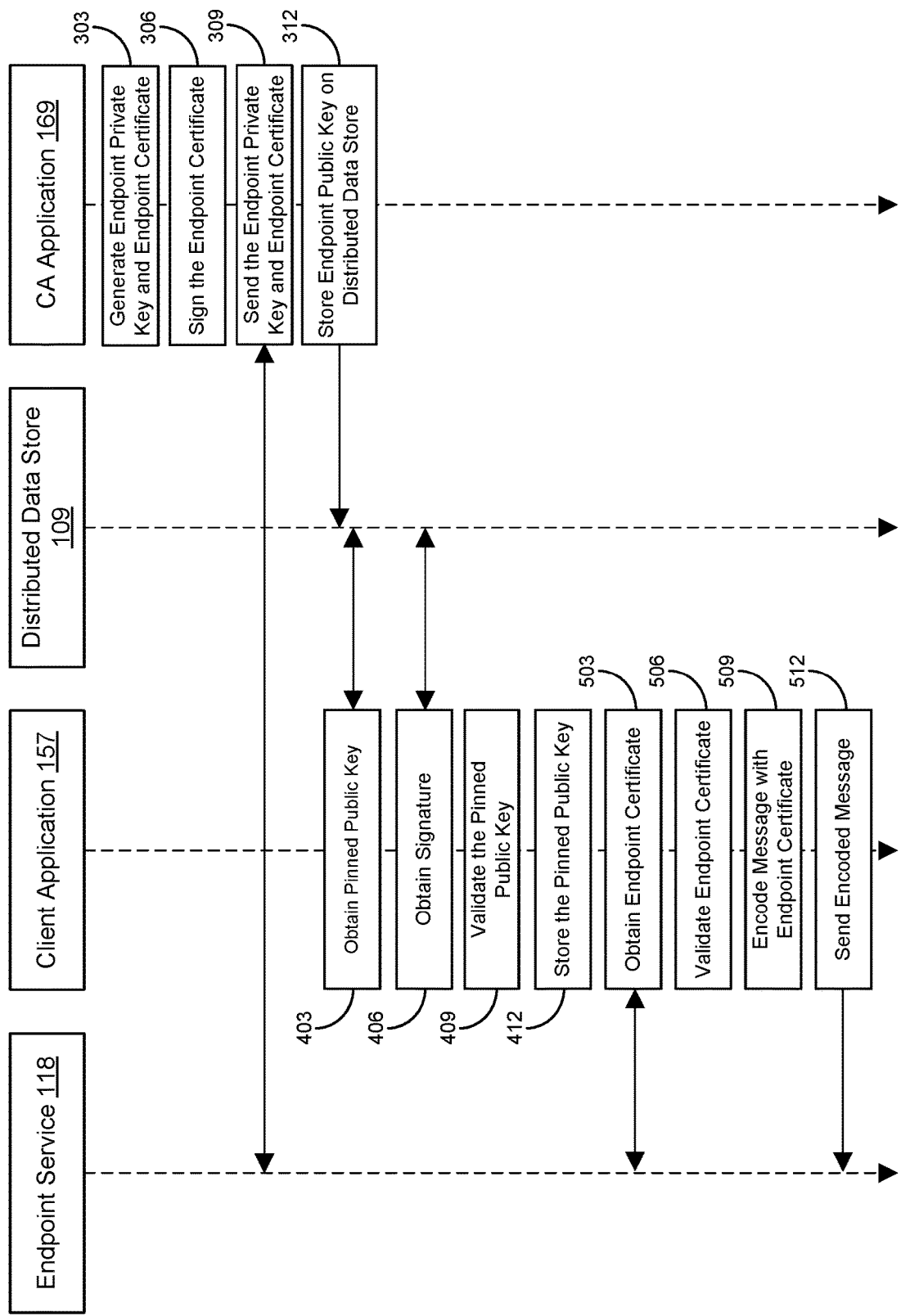

BLOCKCHAIN BASED CERTIFICATE PINNING

BACKGROUND

Network applications often use a version of the secure sockets layer (SSL) or transport layer security (TLS) protocols to secure communications between computing devices, such as between a client and a server or between two servers. The SSL and TLS protocols typically provide both authentication and encryption functionality in order for the computing devices to verify each other's identity and for the computing devices to encrypt communications between each other. These functions are typically implemented through the use of certificates issued to one or more of the computing devices in communication with each other.

For example, a certificate authority can issue a certificate to a server. The certificate typically includes information identifying the owner of the server, the identity of the owner of the certificate authority that issued the certificate, and additional information instructing client devices how to encrypt network traffic sent to the server. When a client attempts a secure communication with the server, the server provides the certificate to the client. The client then verifies that the certificate was issued by the certificate authority. If the certificate authority is included in a list of trusted certificate authorities maintained by the client, the client secures communications with the server using the encryption instructions included in the certificate. Typically, client devices have a preinstalled list of trusted certificate authorities (e.g., a list bundled with the operating system, list bundled with a web browser, or a list bundled with some other client application), although individual certificate authorities can often be manually added to the list of trusted certificate authorities.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 7 is a sequence diagram illustrating one example of the interactions between the components of the network environment of FIG. 1B according to various embodiments of the present disclosure.

DETAILED DESCRIPTION

Figure 1A:
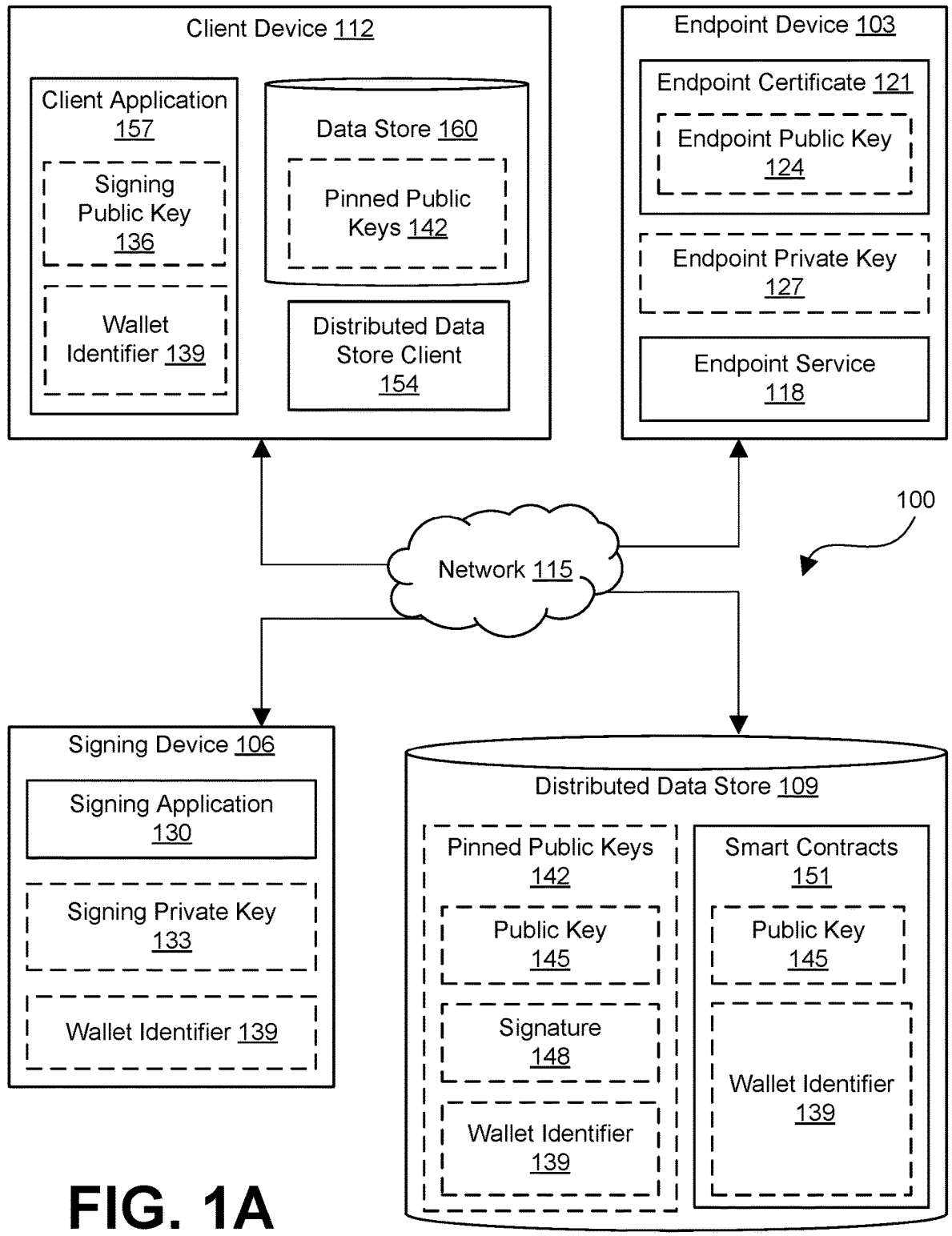
FIG. 1A is a drawing of a network environment according to various embodiments of the present disclosure.

Disclosed are various approaches for replacing hard-coded certificate pinning with blockchain based certificate pinning. Certificate pinning is a technique for mitigating "man-in-the-middle" (MITM) attacks on communications between two computing devices (e.g., a client and a server or between two servers). Certificate pinning is often used as a way to secure a version of the SSL or TLS protocol, but it can also be used in other encryption schemes, such as Secure Shell (SSH) Protocol, Internet Protocol Security (IPSec), Virtual Private Network (VPN) connections, and similar schemes.

In a typical MITM attack, a third-party can intercept all network traffic sent between two computing devices, record and/or modify the intercepted network traffic, and relay the intercepted network traffic to the other computing device. In an example implementation of the attack, the third-party can represent itself to the client device as the server. Likewise, the third-party can represent itself to the server as the client device. Accordingly, the client device can then send a request to the third-party that was intended for the server. The third-party can record the request from the client and then forward the request to the server. The server can then send a reply to the third-party that was intended for the client. The third-party can then record the reply from the server and then forward the reply to the client. The third-party could also manipulate or otherwise change the request and reply in any manner desired.

To prevent a MITM attack, a client and a server can agree to communicate with by creating a secure connection. To establish a secure connection, the client and the server can first verify each other's identities. For example, the server can present a certificate to the client that identifies the server. The certificate can include information that identifies the owner of the server and information regarding the certificate authority that issued or generated the certificate. If the list of trusted certificate authorities on the client device includes the certificate authority, then the client can assume that the server is owned or operated by the party identified in the certificate. The client and the server can then encrypt each packet sent to the other, rendering any intercepted network traffic unreadable and unmodifiable.

However, the third-party can attempt to inject themselves in the middle of this process to create a secure connection by relying on a forged or fraudulently generated certificate. These certificates can be forged or fraudulently generated through a number of approaches. In a simple example, the third-party could hack or otherwise gain control of a certificate authority trusted by the client. The third-party could then use the hacked certificate authority to generate unauthorized certificates on behalf of the server that could be trusted by the client. This could allow the third-party to impersonate the server. Accordingly, the third-party could decrypt network traffic sent from the client to the server, re-encrypt the network traffic and then forward it to the server, or vice versa.

To prevent a third-party from using fraudulently generated or forged certificates, the server can "pin" a public key or a certificate authority. When a public key is pinned to a server, client devices are directed to only use a specified pinned public key for communicating with the server. Other keys are implicitly assumed to be unauthorized, including keys that are included in the list of trusted certificate authorities on the client device. The pinning of public keys or certificates can be accomplished in several ways.

In one such example, pinned public keys can be stored on the client device during the installation of an application. When the client device receives a certificate purported to be issued to the server by a trusted certificate authority, the client can compare the public key specified in the certificate with the pinned public keys stored on the client device. If the public key specified in the certificate matches at least one of the pinned public keys on the client device, the client device can determine that the certificate is valid and the public key is safe to use for encrypting communications with the server. However, if the public key specified in the certificate fails to match any of the pinned public keys on the client device, then the client device can conclude that the certificate is forged or fraudulently issued.

Recently, certificate authorities are issuing certificates that expire in shorter periods of time to increase security on encrypted communications. When issued certificates expire more frequently, applications shipped with pinned public keys also need to be updated more frequently to ensure the pinned public keys match the public keys within the recently issued certificates. The more frequent update schedule creates additional burdens for application developers with respect to keeping their applications up to date and pinned public keys synchronized.

Further, once the application is updated, the client devices with an old version of the application need to install the updates to the application to obtain the latest pinned public keys and to ensure communications between the client device and the server are secure. If a certificate expires before the client device has updated the application, attempts to secure communications between the client and server could fail because the client device does not have the valid pinned public keys to establish the secure communication.

To solve this problem, pinned public keys can be obtained as needed from a distributed ledger. Distributed ledgers, such as blockchains, offer a number of benefits to their users. For example, data stored in a blockchain is immutable, which helps establish trust among stakeholders. Additionally, users can verify the identity of a user that wrote data to a blockchain, which helps establish trust for the validity of the data. As such, pinned public keys can be stored on the blockchain and obtained by a client device in a trusted manner.

In some implementations, executable code, often referred to as a smart contract, can be stored on the blockchain. Parties can request that the nodes of the blockchain or blockchain clients execute these smart contracts on their behalf. These smart contracts, when executed, can return one or more pinned public keys for use by a client device.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1A, shown is a network environment 100 according to various embodiments. The network environment 100 can include an endpoint device 103, a signing device 106, a distributed data store 109, and a client device 112 which can be in data communication with each other via a network 115.

The network 115 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 115 can also include a combination of two or more networks 115. Examples of networks 115 can include the Internet, intranets, extranets, virtual private networks (VPNs), and similar networks.

The endpoint device 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the endpoint device 103 can employ a plurality of computing devices that can be arranged in one or more server banks or computer banks or other arrangements. Such computing devices can be located in a single installation or can be distributed among many different geographical locations. For example, the endpoint device 103 can include a plurality of computing devices that together can include a hosted computing resource, a grid computing resource or any other distributed computing arrangement. In some cases, the endpoint device 103 can correspond to an elastic computing resource where the allotted capacity of processing, network, storage, or other computing-related resources can vary over time.

Various applications or other functionality can be executed in the endpoint device 103. The components executed on the endpoint device 103 include the endpoint service 118 and other applications, services, processes, systems, engines, or functionality not discussed in detail herein.

The endpoint service 118 can be executed to at least receive requests to establish a secure connection with a computing device over the network 115. In response to the request to establish a secure connection with the computing device over the network 115, the endpoint service 118 can be executed to at least send the endpoint certificate 121 to the computing device over the network 115. The endpoint service 118 can further be executed to negotiate a secure connection with the computing device over network 115. As a result of the negotiation to establish a secure connection between the endpoint service 118 and the computing device over the network 115, the secure connection can be established.

In at least one embodiment, the endpoint service 118 can be configured as a web server. The endpoint service 118 as a web server can be configured to receive requests to establish a secure connection. The endpoint service 118 as a webserver can be configured to respond to the request to establish a secure connection by providing the endpoint certificate 121. For example, the endpoint service 118 as a webserver can receive a Hypertext Transfer Protocol Secure (HTTPS) request from a computing device on the network 115. The endpoint service 118, when responding to the HTTPS request, can at least respond to the HTTPS request with the endpoint certificate 121. The endpoint service 118 as a webserver can negotiate the secure connection now that both the endpoint device 103 and the computing device on the network 115 have a copy of the endpoint certificate 121. As a result of the negotiation, the secure connection can be established and the endpoint service 118 as a web server can respond with the requested content from the HTTPS request.

In another embodiment, the endpoint service 118 can be configured as a reverse proxy. The endpoint service 118 as a reverse proxy can perform steps to establish a secure connection but forward any additional processing of the request to another web service or application on the endpoint device 103 or on the network environment 100. The endpoint service 118 as a reverse proxy performs similarly to that of an endpoint service 118 as a web server, but endpoint service 118 as a proxy forwards the unencrypted requests to another web service or application instead of processing the request itself. For example, endpoint service 118 as a reverse proxy can receive a Hypertext Transfer Protocol Secure (HTTPS) request from a computing device on the network 115. The endpoint service 118 as a reverse proxy can at least respond to the HTTPS request with the endpoint certificate 121. The endpoint service 118 as a reverse proxy can negotiate the secure connection now that both the endpoint device 103 and the computing device on the network 115 have a copy of the endpoint certificate 121. As a result of the negotiation, the secure connection can be established. The endpoint service 118 as a reverse proxy can unencrypt the HTTPS request and forward the unencrypted HTTPS request to another webservice or application on the endpoint device 103 or on the network environment 100. The other webservice or application on the endpoint device 103 or on the network environment 100 can send the response to the HTTPS request through the endpoint service 118 as a reverse proxy to the computing device on the network 115. When the endpoint service 118 as a reverse proxy receives the message from the other application or webservice, the endpoint service 118 encrypts the message and forwards the encrypted message to the computing device on the network 115. Each endpoint service 118 can be issued one or more endpoint certificates 121. However, each endpoint certificate 121 directly corresponds to one endpoint service 118 or one endpoint device 103. Each endpoint certificate 121 has at least an endpoint public key 124. The endpoint certificate 121 can include an X.509 digital certificate that can be used to encrypt communications using the endpoint public key 124 between a computing device on the network 115 and the endpoint device 103. Each endpoint certificate 121 can have additional information not discussed in detail herein.

The endpoint public key 124 is part of a public-private key pair with an endpoint private key 127. The endpoint public key 124 and the endpoint private key 127 can be generated using a public key algorithm, such as Rivest-Shamir-Adleman (RSA), ElGamal, Elliptic Curve Cryptography (ECC), and key generation algorithms. The endpoint public key 124 can be used to validate a signature, validates an authentication, and/or encrypt/encode a message. The endpoint private key 127 can be used to generate a signature, authenticate a certificate, and decrypt/decode an encoded message. The endpoint public key 124 can be shared with any computing device to establish a secure connection. The owner of an endpoint private key 127 should keep the endpoint private key 127 secret from others to ensure that others do not intercept and decrypt/decode encrypted messages.

The signing device 106 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the signing device 106 can employ a plurality of computing devices that can be arranged in one or more server banks or computer banks or other arrangements. Such computing devices can be located in a single installation or can be distributed among many different geographical locations. For example, the signing device 106 can include a plurality of computing devices that together can include a hosted computing resource, a grid computing resource, or any other distributed computing arrangement. In some cases, the signing device 106 can correspond to an elastic computing resource where the allotted capacity of processing, network, storage, or other computing-related resources can vary over time. In some embodiments, the signing device 106 can include a hardware security module (HSM). In at least one embodiment, the HSM can perform digital signature functions.

Various applications or other functionality can be executed in the signing device 106. The components executed on the signing device 106 can include the signing application 130 and other applications, services, processes, systems, engines, or functionality not discussed in detail herein.

The signing application 130 can be executed to obtain an endpoint public key 124. The signing application 130 can obtain the endpoint public key 124 in a variety of ways. In one embodiment, the signing application 130 can request the endpoint certificate 121 from the endpoint service 118 over the network 115. The endpoint service 118 should return the endpoint certificate 121 having the endpoint public key 124. In another embodiment, a user can send an endpoint public key 124 from a computing device on the network 115 to the signing application 130. This sending can be facilitated by a user interface. Alternatively, the signing application can be configured as an application programming interface (API) to obtain an endpoint public key 124.

The signing application 130 can further be executed produce a signature for the endpoint public key 124 using the signing private key 133. In at least one embodiment, the signing application 130 can provide the endpoint public key 124 to the HSM to produce the signature for the endpoint public key 124. In other embodiments, the processor of the signing device 106 is used to produce the signature for the endpoint public key 124.

The signing private key 133, in conjunction with an endpoint public key 124, is used to produce a signature for the endpoint public key 124. The signing private key 133 is part of a public-private key pair with a signing public key 136. The signing public key 136 and the signing private key 133 can be generated using a public key generation algorithm, such as RSA, ElGamal, ECC, and key generation algorithms. The signing public key 136 can be used to validate a signature, validates an authentication, and/or encrypt/encode a message. The signing private key 133 can be used to generate a signature, authenticate a certificate, and decrypt/decode an encoded message. The signing public key 136 can be shared with any computing device to establish a secure connection. The owner of a signing private key 133 should keep the signing private key 133 secret from others to ensure that others do not intercept and decrypt/decode encrypted messages. In many embodiments, the signing private key 133 is stored on the signing device 106. In at least one embodiment, the signing private key 133 is stored on the HSM connected to the signing device 106.

The signing application 130 can further be executed to store the endpoint public key 124, the signature produced by the signing application 130, or both on a distributed data store 109 corresponding to a predefined wallet identifier 139. In some embodiments, the endpoint public key 124, the signature produced by the signing application 130, or both are written directly to the distributed data store 109. In other embodiments, the signing application 130 writes a smart contract to the distributed data store 109.

The signing application 130 can be associated with a wallet identifier 139, which could be computed from or derived from the public key of a public-private key pair controlled by the owner or operator of the signing device 106. The wallet identifier 139 can represent the owner or operator of the signing device 106 and/or act as an identifier of the owner or operator of the signing device 106 in the distributed data store 109. Although a signing device 106 could have multiple wallet identifiers 139, in at least some implementations, the signing application 130 could use a single wallet identifier 139 to easily identify all of the pinned public keys 142.

The distributed data store 109 represents a data storage network that is formed from multiple computing devices acting as nodes in the data storage network. In some implementations, any computing device could participate as a node of the distributed data store 109, including one or more endpoint devices 103, one or more signing devices 106, or one or more client devices 112. In general, each node can store a copy of the data stored in the distributed data store 109. When data is to be written to the distributed data store 109, each node can communicate with other nodes of the distributed data store 109 to validate and/or coordinate the storage of new records or data to the distributed data store 109. An illustrative example of a distributed data store 109 could be a blockchain which uses a proof-of-work, proof-of-stake, or proof-of-authority protocol to validate new blocks of data stored on the blockchain. Various types of data can be stored by the distributed data store 109.

For example, the distributed data store 109 can store one or more pinned public keys 142. Each pinned public key 142 can group a public key 145 with a signature 148. Each pinned public key 142 is written to the distributed data store 109 using the wallet identifier 139. Each pinned public key 142 can be stored with and/or identified by a wallet identifier 139.

The public keys 145 could be one or more endpoint public keys 124. A public key 145 that is an endpoint public key 124 can have all the features of an endpoint public key 124 as previously discussed. The public keys 145 could also include one or more signing public key 136. A public key 145 that is a signing public key 136 can have all the features of a signing public key 136 as previously discussed.

The signatures 148 are the signatures produced by the signing application 130 using the signing private key 133 and the endpoint public key 124. Each signature 148 stored in the pinned public keys 142 can correspond to a specific public key 145.

In another example, the distributed data store 109 can store one or more smart contracts 151. Smart contracts 151 are executable programs that are both stored in the distributed data store 109 and executable by the nodes of the distributed data store 109. The smart contract 151 can be executed automatically when one or more predetermined conditions are met. The smart contract 151 can also be called, invoked, or executed by a node of the distributed data store 109 or a client device 112 interacting with the distributed data store 109, such as a distributed data store client 154. In various embodiments of the present disclosure, a smart contract 151 could be executed to retrieve one or more pinned public keys 142 according to one or more predefined parameters and/or one or more arguments passed as input values to the smart contract 151. Each smart contract 151 can be stored with and/or identified by a wallet identifier 139.

The client device 112 can represent a plurality of client devices 112 or a single client device 112 that can be coupled to the network 115. The client device 112 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 112 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 112 or can be connected to the client device 112 through a wired or wireless connection.

The client device 112 can be configured to execute various applications such as a distributed data store client 154, a client application 157, or other applications. The client application 157 can be executed in a client device 112 to access network content served up by the network environment 100 or other servers, thereby rendering a user interface on the display. To this end, the client application 157 can include a browser, a dedicated application, or other executable, and the user interface can include a network page, an application screen, or other user mechanism for obtaining user input. The client device 112 can be configured to execute applications beyond the client application 157 such as email applications, social networking applications, word processors, spreadsheets, or other applications.

The distributed data store client 154 can be executed to facilitate the integration of the client application 157 with the distributed data store 109. Accordingly, the distributed data store client 154 can be used by the client application 157 to read data, such as the pinned public keys 142, stored in the distributed data store 109 as needed. Additionally, the distributed data store client 154 can also call, invoke, or execute a smart contract 151 maintained by the distributed data store 109.

The client application 157, prior to establishing a secure connection between the client device 112 the endpoint device 103, can direct the distributed data store client 154 to obtain the latest pinned public keys 142 from the distributed data store 109. The client application 157 can provide the wallet identifier 139, as well as other information like URL or IP address, to the distributed data store client 154 to identify the pinned public keys 142.

The client application 157 can validate the public keys 145. In at least one embodiment, the client application can validate the public keys 145 by validating the corresponding signature 148 using the signing public key 136 stored in the client application 157. In other embodiments, the client application 157 can validate the pinned public keys 142 by verifying that the wallet identifier 139 stored in the client application 157 matches the wallet identifier 139 stored in the pinned public key 142. In embodiments using smart contracts 151, the client application 157 trusts a smart contract 151 that is called, invoked, or executed by the distributed data store client 154. If the wallet identifier 139 corresponding to the smart contract 151 matches the wallet identifier 139 within the client application 157, then the public keys 145 that are returned by the smart contract 151, and subsequently the distributed data store client 154, are presumed valid.

The client application 157 can be configured to update or store the public keys 145 in the data store 160. Storing the pinned public keys 142 in the data store 160 allows the client application 157 to easily reuse valid, non-expired public keys to establish a secure connection between the client device 112 and the endpoint device 103 without having to retrieve the pinned public keys 142 from the distributed data store 109.

The client application 157 can be configured to establish a secure connection between the client device 112 and the endpoint device 103. To do so, the client application 157 can obtain the endpoint certificate 121 from the endpoint device 103, validate the endpoint certificate 121, encode a message using the endpoint certificate 121, and send the encoded message to the endpoint device 103.

Also, various data is stored in a data store 160 that is accessible to the client device 112. The data store 160 can be representative of a plurality of data stores 160, which can include relational databases or non-relational databases such as object-oriented databases, hierarchical databases, hash tables or similar key-value data stores, as well as other data storage applications or data structures. Moreover, combinations of these databases, data storage applications, and/or data structures can be used together to provide a single, logical, data store. The data stored in the data store 160 is associated with the operation of the various applications or functional entities described below. This data can include pinned public keys 142 and potentially other data. Although FIG. 1 demonstrates that the client application 157 stores the signing public key 136 and the wallet identifier 139, there can be some embodiments where the data store 160 stores the signing public key 136 and the wallet identifier 139.

Figure 1B:
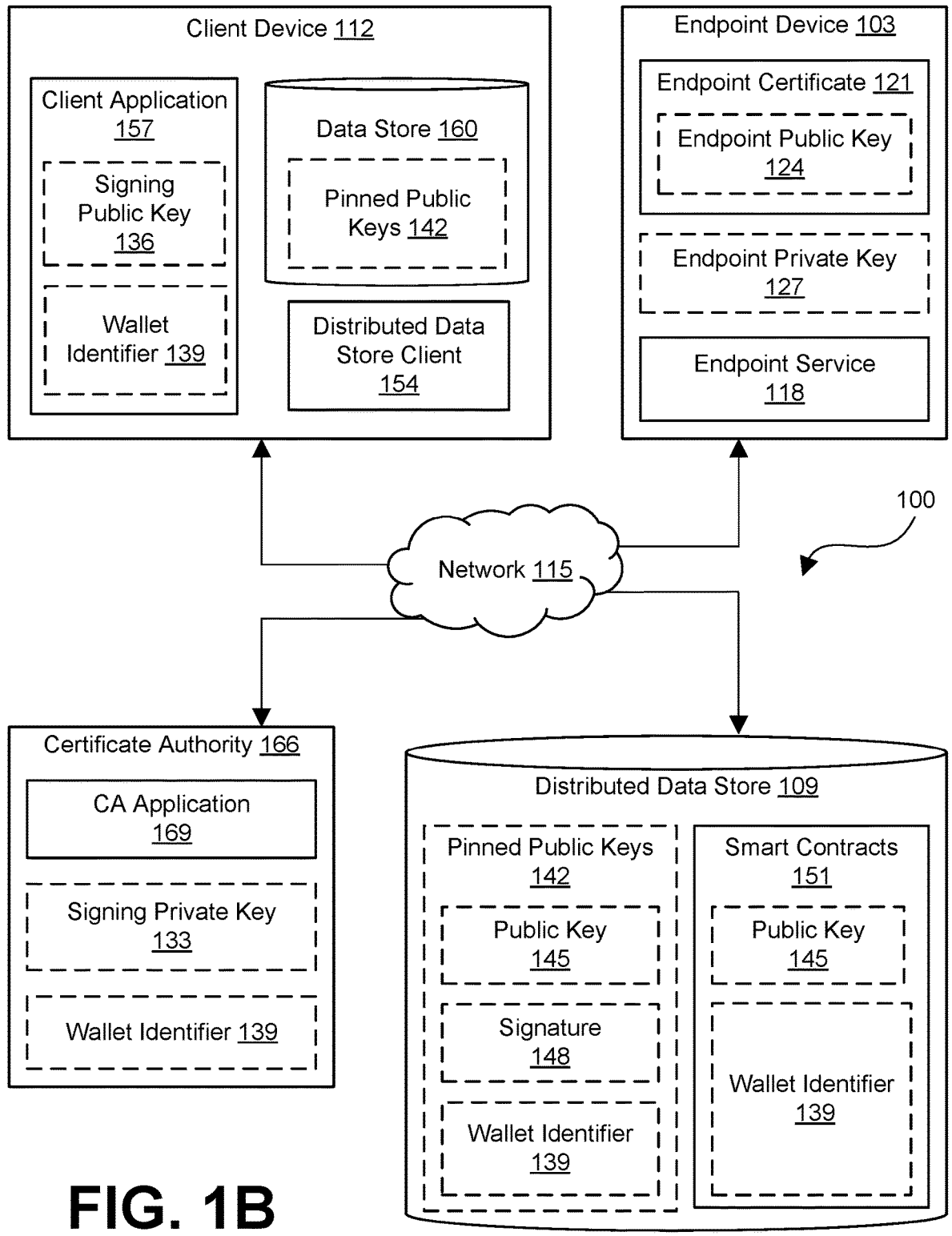
FIG. 1B is a drawing of an alternative network environment according to various embodiments of the present disclosure.

With reference to FIG. 1B, shown is a network environment 100 according to other various embodiments. The network environment 100 can include an endpoint device 103, a certificate authority 166, a distributed data store 109, and a client device 112 which can be in data communication with each other via a network 115. The descriptions of the network 115, the client device 112, the endpoint device 103, and the distributed data store 109 of FIG. 1B are identical to the descriptions of the network 115, the client device 112, the endpoint device 103, and the distributed data store 109 of FIG. 1A. As such, the descriptions of the network 115, the client device 112, the endpoint device 103, and the distributed data store 109 of FIG. 1A are incorporated to the description of the network environment 100 of FIG. 1B.

The certificate authority 166 (CA) can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the certificate authority 166 can employ a plurality of computing devices that can be arranged in one or more server banks or computer banks or other arrangements. Such computing devices can be located in a single installation or can be distributed among many different geographical locations. For example, the certificate authority 166 can include a plurality of computing devices that together can include a hosted computing resource, a grid computing resource or any other distributed computing arrangement. In some cases, the certificate authority 166 can correspond to an elastic computing resource where the allotted capacity of processing, network, storage, or other computing-related resources can vary over time. In some embodiments, the certificate authority 166 can include a HSM. In at least one embodiment, the HSM can perform digital signature functions.

Various applications or other functionality can be executed in the certificate authority 166. The components executed on the certificate authority 166 can include the CA application 169 and other applications, services, processes, systems, engines, or functionality not discussed in detail herein.

The CA application 169 can be executed to generate an endpoint private key 127 and an endpoint certificate 121 having an endpoint public key 124 for the endpoint device 103 and/or the endpoint service 118. The CA application 169 can generate the endpoint public key 124 and the endpoint private key 127 using a public key algorithm, such as RSA, ElGamal, ECC, and other key generation algorithms.

The CA application 169 can be further executed to sign the endpoint certificate 121. The CA application 169 can sign the endpoint certificate 121 using the signing private key 133. The signing private key 133 is part of a public-private key pair with a signing public key 136. The signing private key 133 and the signing public key 136 are described fully in the description for FIG. 1A.

The CA application 169 can be executed to send the endpoint private key 127 and the endpoint certificate 121 having the endpoint public key 124 to the owner of the endpoint device 103 and/or the owner of the endpoint service 118. The CA application 169 can send the endpoint private key 127 and endpoint certificate 121 various ways. In at least one embodiment, the CA application 169 can provide a user interface for the owner of the endpoint device 103 and/or the owner of the endpoint service 118 to obtain the endpoint private key 127 and the endpoint certificate 121 having an endpoint public key 124. In at least another embodiment, the CA application 169 can provide an API that is configured to allow a computing device on the network 115 to obtain the endpoint private key 127 and the endpoint certificate 121 having an endpoint public key 124.

The CA application 169 can be executed to store the signed endpoint certificate 121 on a distributed data store 109 corresponding to a predefined wallet identifier 139. In some embodiments, the CA application 169 can store the endpoint certificate 121 as a pinned public key 142 directly to the distributed data store. In other embodiments, the CA application 169 can store select information, such as the endpoint public key 124 and a signature from the endpoint certificate 121, directly to the distributed data store 109 without storing the entire endpoint certificate 121. In other embodiments, the signing application 130 writes a smart contract to the distributed data store 109.

The CA application 169 can have a wallet identifier 139. In some embodiments, the wallet identifier 139 which could be a private key in a public-private key pair controlled by the owner or operator of the certificate authority 166. In other embodiments, the wallet identifier 139 can represent a public key in a public-private key pair controlled by the owner or operator of the certificate authority 166 to act as an identifier of the owner or operator of the certificate authority 166 in the distributed data store 109. In yet another embodiment, the wallet identifier 139 can represent a public key in a public-private key pair controlled by the owner or operator of the endpoint device 103 to act as an identifier of the owner or operator of the endpoint device 103 in the distributed data store 109. Although a certificate authority 166 could have multiple wallet identifiers 139, in at least some implementations, the certificate authority 166 could use a single wallet identifier 139 to easily identify all of the pinned public keys 142.

In some embodiments, the CA application can store the endpoint certificate 121 using multiple wallet identifiers 139. For example, to demonstrate a transaction from the certificate authority 166 to the endpoint device 103 on the distributed data store 109, the CA application 169 can store the endpoint certificate 121 on the distributed data store 109 with information demonstrating that a wallet identifier 139 of the certificate authority 166 issued a pinned public key 142 to the endpoint device 103.

Next, a general description of the operation of the various components of the network environment 100 is provided. Although the following description describes one example of the interaction between the various components of the network environment 100, it should be understood that the different components of the network environment 100 can operate or interact in other ways. More detailed descriptions of the operation of individual components of the network environment 100 is provided in the descriptions of the subsequent figures.

Figure 2:
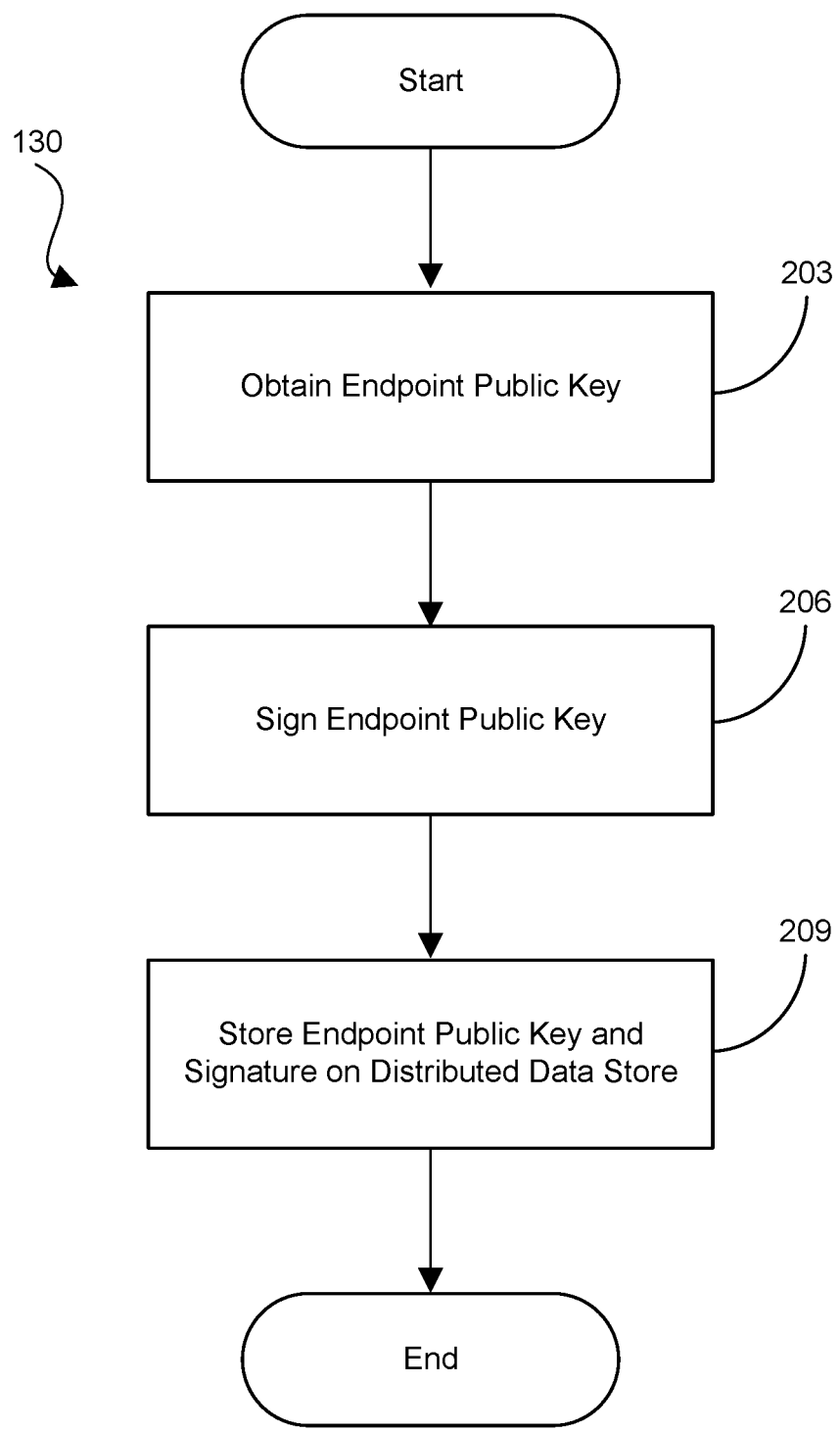
FIG. 2 is a flowchart illustrating one example of functionality implemented as portions of an application executed in a computing device in the network environment of FIG. 1A according to various embodiments of the present disclosure.

To begin, the signing application 130 could obtain the endpoint certificate 121 comprising an endpoint public key 124 from the endpoint device 103. The signing application 130 produces a signature for the endpoint public key 124 using the signing private key 133. The signing application 130 then stores the endpoint public key 124, the signature for the endpoint public key, and the wallet identifier 139 on the signing device 106 as a pinned public key 142 on the distributed data store 109. A client device 112 can obtain the latest pinned public keys 142 from the distributed data store 109, validate the public keys 145 within the pinned public keys 142, and store the pinned public keys 142 in the data store 160. The client device 112 can obtain the endpoint certificate 121 and validate the endpoint certificate 121. The client device 112 can use the endpoint certificate 121 to encode a message and send the message to the endpoint device 103. FIG. 2 is a flowchart depicting the operation of various portions of the signing application 130. The flowchart of FIG. 2 provides merely an example of the many different types of functional arrangements that can be employed to implement the operation of the depicted portion of the signing application 130. As an alternative, the flowchart of FIG. 2 can be viewed as depicting an example of elements of a method implemented on the signing device 106.

Beginning with step 203, the signing application 130 can obtain an endpoint public key 124. The signing application 130 can obtain the endpoint public key 124 in a variety of ways. In one embodiment, the signing application 130 can request the endpoint certificate 121 from the endpoint service 118 over the network 115. The endpoint service 118 can return the endpoint certificate 121 having the endpoint public key 124. In another embodiment, a user can send an endpoint public key 124 from a computing device on the network 115 to the signing application 130. This sending can be facilitated by a user interface. Alternatively, the signing application can be configured as an application programming interface (API) to receive an endpoint public key 124.

Proceeding with step 206, the signing application 130 can produce a signature for the endpoint public key 124 using the signing private key 133. In at least one embodiment, the signing application 130 may provide the endpoint public key 124 to the HSM to produce the signature for the endpoint public key 124. In other embodiments, the processor of the signing device 106 is used to produce the signature for the endpoint public key 124. The signing application 130 can produce the signatures by various digital signature generating algorithms, such as RSA, DSA, ECDSA, RSA with SHA, Aggregate signature, or other digital signature algorithms.

Proceeding with step 209, the signing application 130 can store the endpoint public key 124, the signature produced by the signing application 130, or both on a distributed data store 109 corresponding to a predefined wallet identifier 139. In some embodiments, the endpoint public key 124, the signature produced by the signing application 130, or both are written directly to the distributed data store 109 with the predefined wallet identifier 139. In other embodiments, the signing application 130 writes a smart contract to the distributed data store 109.

Figure 3:
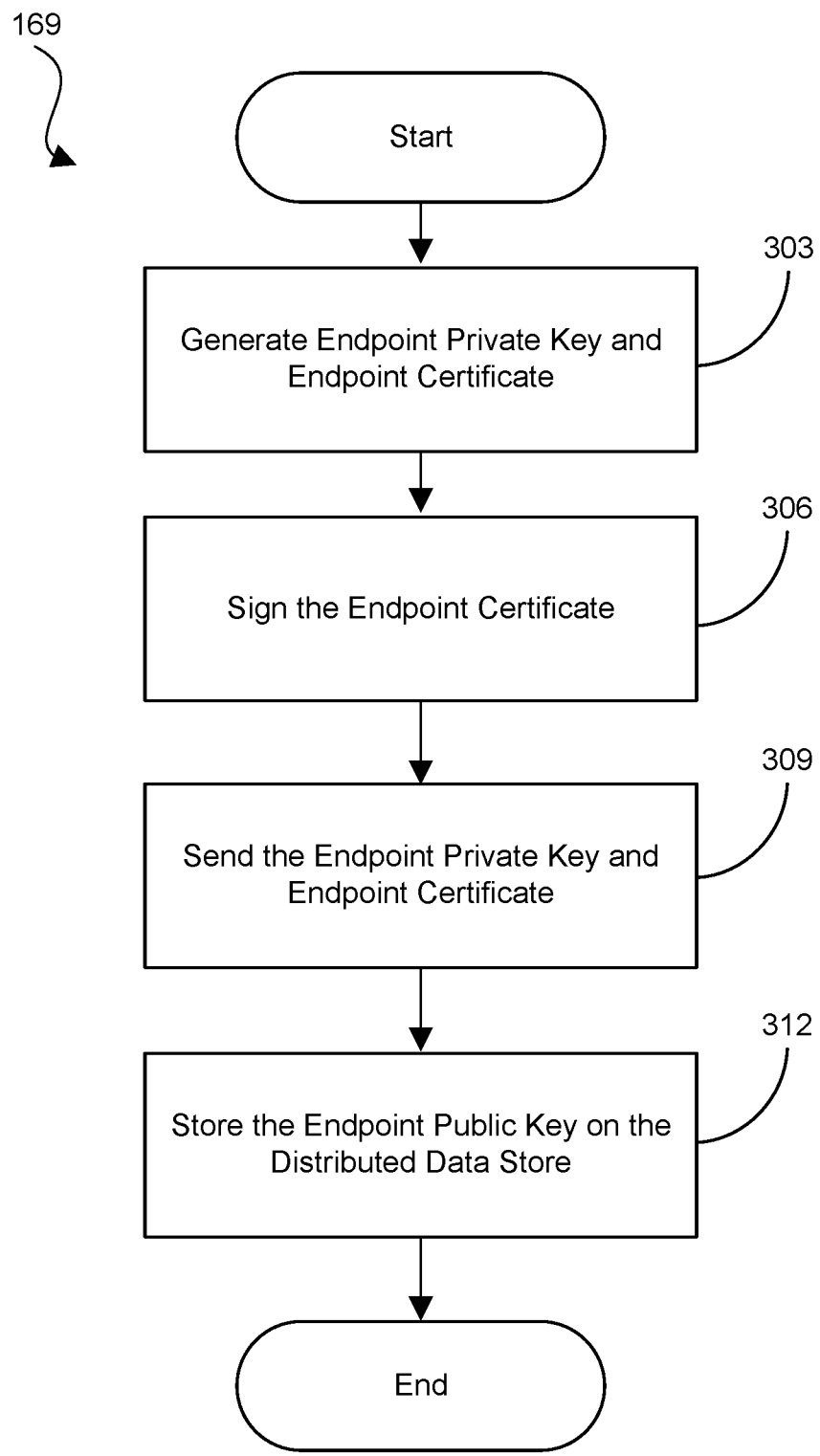
FIG. 3 is a flowchart illustrating one example of functionality implemented as portions of an application executed in a computing device in the network environment of FIG. 1B according to various embodiments of the present disclosure.

FIG. 3 is a flowchart depicting the operation of various portions of the CA application 169. The flowchart of FIG. 3 provides merely an example of the many different types of functional arrangements that can be employed to implement the operation of the depicted portion of the CA application 169. As an alternative, the flowchart of FIG. 6 can be viewed as depicting an example of elements of a method implemented by the certificate authority 163.

Beginning with step 303, the CA application 169 can generate an endpoint private key 127 and an endpoint certificate 121 having an endpoint public key 124 for the endpoint device 103 and/or the endpoint service 118. The CA application 169 can generate the endpoint public key 124 and the endpoint private key 127 using a public key algorithm, such as RSA, ElGamal, ECC, and other key generation algorithms.

Proceeding to step 306, the CA application 169 can sign the endpoint certificate 121. The CA application 169 can sign the endpoint certificate 121 using the signing private key 133. The signing private key 133 is part of a public-private key pair with a signing public key 136. The signing public key 136 and the signing private key 133 can be generated using a public key generation algorithm, such as RSA, ElGamal, ECC, and key generation algorithms. The signing public key 136 can be used to validate a signature, validate an authentication, and/or encrypt/encode a message. The signing private key 133 can be used to generate a signature, authenticate a certificate, and decrypt/decode an encoded message. The signing public key 136 can be shared with any computing device to establish a secure connection. The owner of a signing private key 133 should keep the signing private key 133 secret from others to ensure that others do not intercept and decrypt/decode encrypted messages. In many embodiments, the signing private key 133 is stored on the certificate authority 166. In at least one embodiment, the signing private key 133 is stored on the HSM connected to the certificate authority 166.

Proceeding to step 309, the CA application 169 can send the endpoint private key 127 and the endpoint certificate 121 having the endpoint public key 124 to the owner of the endpoint device 103 and/or the owner of the endpoint service 118. The CA application 169 can send the endpoint private key 127 and endpoint certificate 121 various ways. In at least one embodiment, the CA application 169 can provide a user interface for the owner of the endpoint device 103 and/or the owner of the endpoint service 118 to obtain the endpoint private key 127 and the endpoint certificate 121 having an endpoint public key 124. In at least another embodiment, the CA application 169 can provide an API that is configured to allow a computing device on the network 115 to obtain the endpoint private key 127 and the endpoint certificate 121 having an endpoint public key 124.

Proceeding to step 312, the CA application 169 can store the endpoint public key 124 on a distributed data store 109 corresponding to a predefined wallet identifier 139. In other embodiments, the CA application 169 can store select information, such as the endpoint public key 124 and a signature from the endpoint certificate 121, directly to the distributed data store 109 without storing the entire endpoint certificate 121. For example, the CA application 169 could store the endpoint public key 124 and the signature created from step 306 in the distributed data store 109. In some embodiments, the CA application 169 can store the endpoint certificate 121 having an endpoint public key 124 directly to the distributed data store 109. For example, the CA application 169 could directly store the entire endpoint certificate 121 on the distributed data store 109. In other embodiments, the signing application 130 can write a smart contract to the distributed data store 109.

Figure 4:
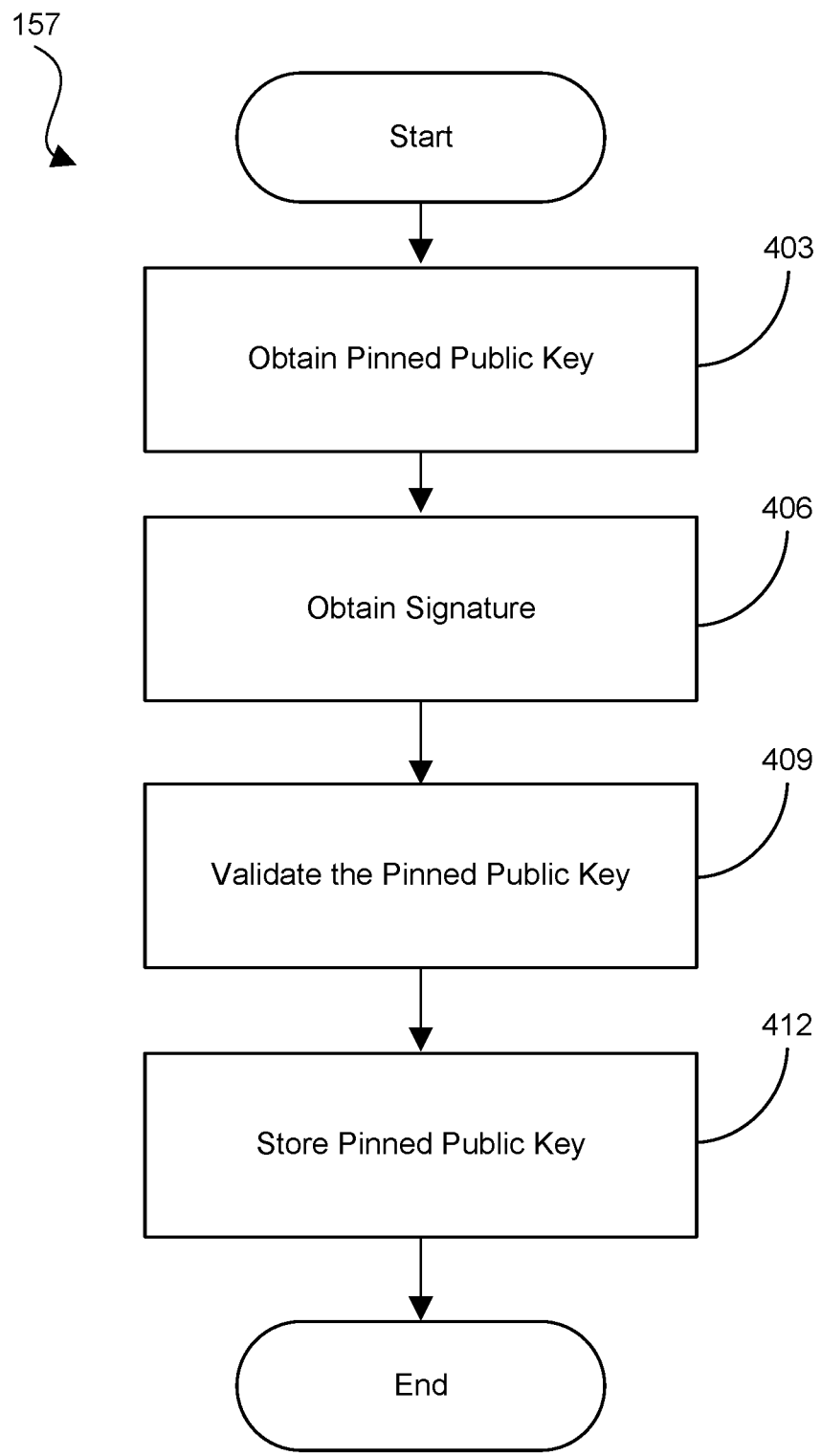
FIG. 4 is a flowchart illustrating one example of functionality implemented as portions of an application executed in a computing device in the network environment of FIG. 1A or B according to various embodiments of the present disclosure.

Referring next to FIG. 4 is a flowchart depicting the operation of various portions of the client application 157. The flowchart of FIG. 4 provides merely an example of the many different types of functional arrangements that can be employed to implement the operation of the depicted portion of the client application 157. As an alternative, the flowchart of FIG. 4 can be viewed as depicting an example of elements of a method implemented on the client device 112.

Beginning with step 403, the client application 157 can obtain a public key 145 from the distributed data store 109. The client application 157 may direct the distributed data store client 154 to read the pinned public keys 142 from the distributed data store 109. Alternatively, the client application 157 may direct the distributed data store client 154 to invoke, call, or execute a smart contract 151 stored on the distributed data store 109, which returns public keys 145. The client application 157 may provide the wallet identifier 139, as well as other information like URL or IP address, to the distributed data store client 154 to obtain the pinned public keys 142.

Proceeding with step 406, the client application 157 can obtain the signature 148 from the distributed data store 109 corresponding to the public key 145 obtained from step 403. The client application 157 may direct the distributed data store client 154 to read the signature 148 from the distributed data store 109. If the client application obtained the public keys 145 from the smart contracts 151 in step 403, then step 406 may be skipped.

Proceeding with step 409, the client application 157 can validate the public keys 145. In at least one embodiment, the client application 157 can validate the public keys 145 by validating the corresponding signature 148 using the signing public key 136 stored in the client application 157. In other embodiments, the client application 157 may validate the pinned public keys 142 by verifying that the wallet identifier 139 stored in the client application 157 matches the wallet identifier 139 stored in the pinned public key 142. In embodiments using smart contracts 151, the client application 157 may trust a smart contract 151 called, invoked, or executed by the distributed data store client 154. If the wallet identifier 139 corresponding to the smart contract 151 matches the wallet identifier 139 within the client application 157, then the public keys 145 that are returned by the smart contract 151 are presumed valid.

Proceeding with step 412, the client application 157 can store the public keys 145 in the data store 160. Storing the pinned public keys 142 in the data store 160 allows the client application 157 to easily reuse valid, non-expired public keys to establish a secure connection between the client device 112 and the endpoint device 103 without having to retrieve the pinned public keys 142 from the distributed data store 109.

Figure 5:
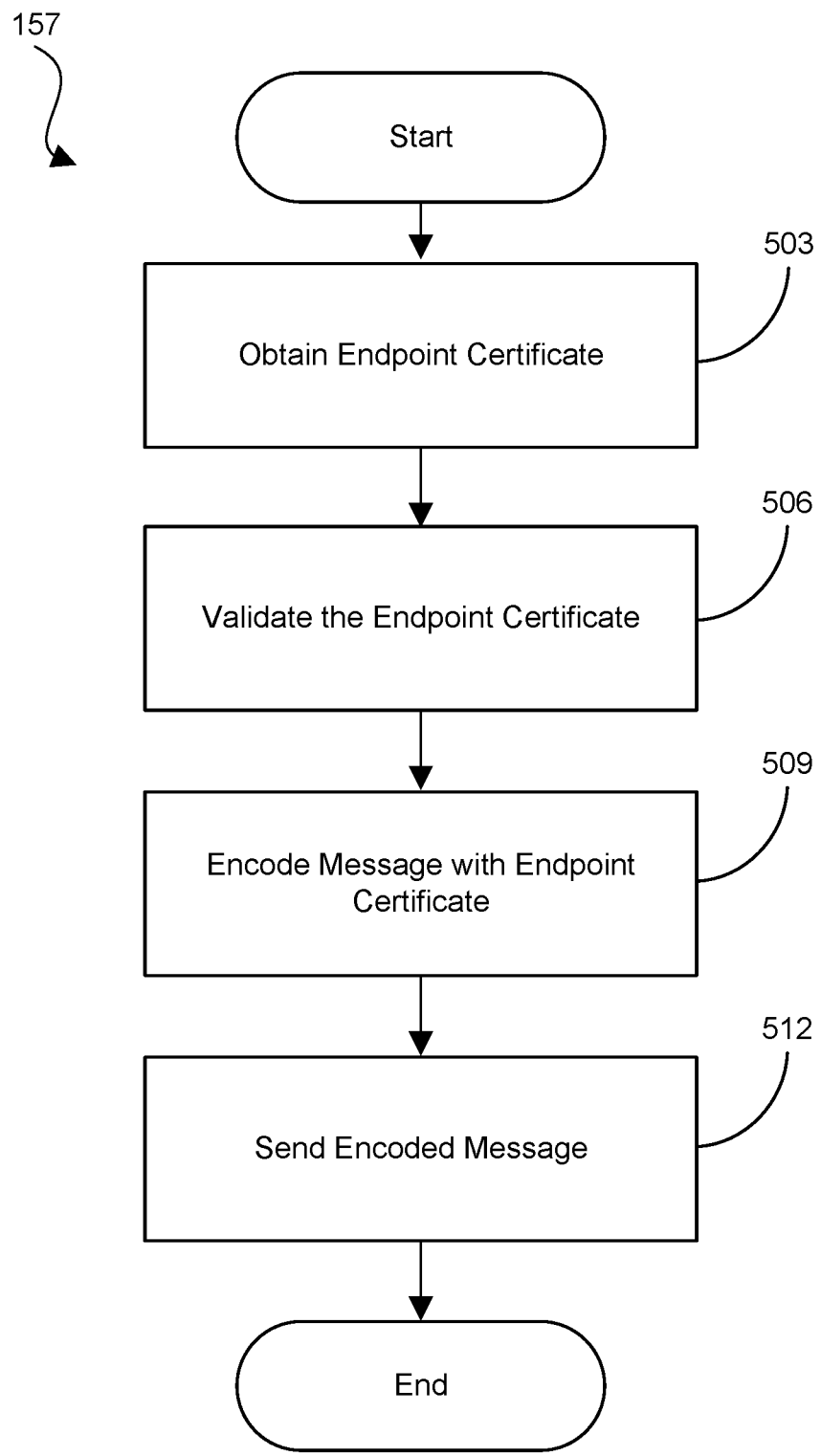
FIG. 5 is a flowchart illustrating one example of functionality implemented as portions of an application executed in a computing device in the network environment of FIG. 1A or 1B according to various embodiments of the present disclosure.

Referring next to FIG. 5 is a flowchart depicting the operation of various portions of the client application 157. The flowchart of FIG. 5 provides merely an example of the many different types of functional arrangements that can be employed to implement the operation of the depicted portion of the client application 157. As an alternative, the flowchart of FIG. 5 can be viewed as depicting an example of elements of a method implemented on the client device 112.

Beginning with step 503, the client application 157 can obtain the endpoint certificate 121 from the endpoint device 103. In some embodiments, the client application 157 can make a request the endpoint certificate 121 over the network 115 to the endpoint device 103. As a result of the request, the endpoint device 103 or the endpoint service 118 responds to the client application 157 with the endpoint service.

Proceeding with step 506, the client application 157 can validate the endpoint certificate 121. The client application 157 can validate the endpoint certificate 121 by comparing the endpoint public key 124 with the public keys 145 of the pinned public keys 142 stored in data store 160. If a public key 145 of the pinned public keys 142 stored in data store 160 matches the endpoint public key 124, then the endpoint certificate 121 is valid.

Proceeding with step 509, the client application 157 can encode a message using the endpoint certificate 121. In some embodiments, the endpoint certificate 121 may include an X.509 digital certificate that can be used to encrypt communications using the endpoint public key 124 between a computing device on the network 115 and the endpoint device 103. In the embodiments where the endpoint certificate 121 includes an x.509 digital certificate, the certificate is used to encrypt a message. In other embodiments, the client application 157 may encode the message using endpoint public key 124 and an encryption algorithm. An endpoint certificate 121 may specify a specific encryption algorithm to be used in the encoded communications between a client device 112 and the endpoint device 103.

Proceeding with step 512, the client application 157 can send the encoded message to the endpoint device 103. The client application 157 sends the encoded message over the network 115 to the endpoint device 103. In at least some embodiments, the message contains a secret used to establish a secure connection between the client device 112 and the endpoint device 103.

Figure 6:
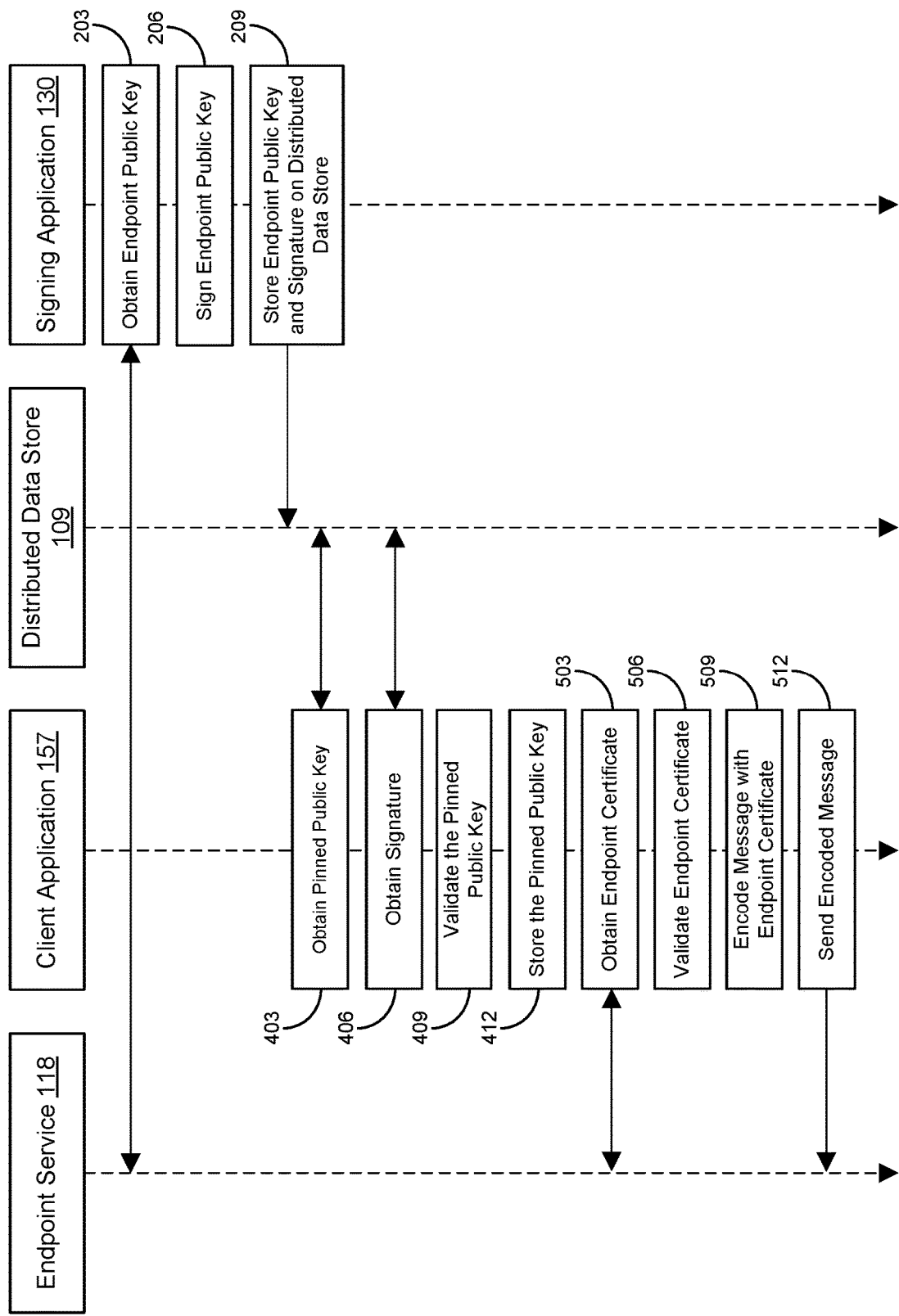
FIG. 6 is a sequence diagram illustrating one example of the interactions between the components of the network environment of FIG. 1A according to various embodiments of the present disclosure.

Referring next to FIG. 6, shown is a sequence diagram that illustrates the interactions between the endpoint service 118, the client application 157, the distributed data store 109, and the signing application 130. The sequence diagram of FIG. 6 provides merely an example of the many different types of functional arrangements that can be employed to implement the operation of the depicted portion between the endpoint service 118, the client application 157, the distributed data store 109, and the signing application 130. As an alternative, the sequence diagram of FIG. 6 can be viewed as depicting an example of elements of a method implemented in the network environment 100.

To begin, the signing application 130 can obtain the endpoint public key 124 from the endpoint service 118, as previously described in the discussion of step 203 of FIG. 2. The signing application 130 can sign the endpoint public key 124, as previously described in the discussion of step 206 of FIG. 2. The signing application 130 can store the endpoint public key 124 and signature on the distributed data store 109, as previously described in the discussion of step 209 of FIG. 2. The client application 157 can obtain a public key 145 from the distributed data store 109, as previously described in the discussion of step 403 of FIG. 4. The client application 157 can obtain the signature 148 from the distributed data store 109 corresponding to the public key 145 obtained from step 403, as previously described in the discussion of step 406 of FIG. 4. The client application 157 can validate the public keys 145, as previously described in the discussion of step 409 of FIG. 4. The client application 157 can store the public keys 145 in the data store 160, as previously described in the discussion of step 412 of FIG. 4. The client application 157 can obtain the endpoint certificate 121 from the endpoint device 103, as previously described in the discussion of step 503 of FIG. 5. The client application 157 can validate the endpoint certificate 121, as previously described in the discussion of step 506 of FIG. 5. The client application 157 can encode a message using the endpoint certificate 121, as previously described in the discussion of step 509 of FIG. 5. The client application 157 can send the encoded message to the endpoint device 103, as previously described in the discussion of step 512 of FIG. 5.

Referring next to FIG. 7, shown is a sequence diagram that illustrates the interactions between the endpoint service 118, the client application 157, the distributed data store 109, and the CA application 169. The sequence diagram of FIG. 7 provides merely an example of the many different types of functional arrangements that can be employed to implement the operation of the depicted portion between the endpoint service 118, the client application 157, the distributed data store 109, and the CA application 169. As an alternative, the sequence diagram of FIG. 6 can be viewed as depicting an example of elements of a method implemented in the network environment 100.

To begin, the CA application 169 can generate an endpoint private key 127 and an endpoint certificate 121, as previously described in the discussion of step 303 of FIG. 3. The CA application 169 can sign the endpoint certificate 121, as previously described in the discussion of step 306 of FIG. 3. The CA application 169 can send the endpoint private key 127 and the endpoint certificate 121 and signature to the endpoint service 118, as previously described in the discussion of step 309 of FIG. 3. The CA application 169 can store the endpoint certificate 121 on the distributed data store 109, as previously described in the discussion of step 312 of FIG. 3. The client application 157 can obtain a public key 145 from the distributed data store 109, as previously described in the discussion of step 403 of FIG. 4. The client application 157 can obtain the signature 148 from the distributed data store 109 corresponding to the public key 145 obtained from step 403, as previously described in the discussion of step 406 of FIG. 4. The client application 157 can validate the public keys 145, as previously described in the discussion of step 409 of FIG. 4. The client application 157 can store the public keys 145 in the data store 160, as previously described in the discussion of step 412 of FIG. 4. The client application 157 can obtain the endpoint certificate 121 from the endpoint device 103, as previously described in the discussion of step 503 of FIG. 5. The client application 157 can validate the endpoint certificate 121, as previously described in the discussion of step 506 of FIG. 5. The client application 157 can encode a message using the endpoint certificate 121, as previously described in the discussion of step 509 of FIG. 5. The client application 157 can send the encoded message to the endpoint device 103, as previously described in the discussion of step 512 of FIG. 5.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The FIGS. 2-7 show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the FIGS. 2-7 show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in FIGS. 2-7 can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium could include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same network environment 100.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
   a computing device comprising a processor and a memory; and
   machine readable instructions stored in the memory that, when executed by the processor, cause the computing device to at least:
      execute a smart contract of a blockchain to obtain a pinned public key from the blockchain, wherein the pinned public key is pinned to be used by the computing device with a specific endpoint;
      validate the pinned public key;
      store the pinned public key on the computing device;
      receive, from an endpoint device, an endpoint certificate issued by a certificate authority, wherein the endpoint certificate includes an endpoint public key; and
      validate the endpoint certificate by determining that the endpoint public key matches the pinned public key stored on the computing device.

2. The system of claim 1, wherein the machine readable instructions, when executed by the processor, further cause the computing device to at least obtain a signature of the pinned public key from the blockchain.

3. The system of claim 2, wherein a signing public key is stored on the computing device and wherein the machine readable instructions that validate the pinned public key, when executed by the processor, further cause the computing device to at least perform a signature check using the pinned public key, the signature of the pinned public key, and the signing public key.

4. The system of claim 1, wherein the machine readable instructions that obtain the pinned public key from the blockchain, when executed by the processor, further cause the computing device to at least obtain the pinned public key based on a predefined wallet identifier.

5. The system of claim 4, wherein the machine readable instructions that obtain the pinned public key from the blockchain, when executed by the processor, further cause the computing device to at least execute the smart contract associated with the predefined wallet identifier.

6. A method, comprising:
   executing a smart contract of a blockchain to obtain a pinned public key from the blockchain, wherein the pinned public key is pinned to be used by a computing device with a specific endpoint;
   validating the pinned public key;
   storing the pinned public key;
   receiving, from an endpoint device, an endpoint certificate issued by a certificate authority, wherein the endpoint certificate includes an endpoint public key; and
   validating the endpoint certificate by determining that the endpoint public key matches the pinned public key stored on the computing device.

7. The method of claim 6, further comprising obtaining a signature of the pinned public key from the blockchain.

8. The method of claim 7, wherein validating the pinned public key comprises performing a signature check using the pinned public key, the signature of the pinned public key, and a signing public key.

9. The method of claim 6, wherein obtaining the pinned public key from the blockchain comprises requesting the pinned public key from the blockchain based on a predefined wallet identifier.

10. The method of claim 9, wherein obtaining the pinned public key from the blockchain comprises executing the smart contract associated with the predefined wallet identifier.

11. A non-transitory computer readable medium comprising machine readable instructions that, when executed by a processor of a computing device, cause the computing device to at least:
   execute a smart contract of a blockchain to obtain a pinned public key from the blockchain, wherein the pinned public key is pinned to be used by the computing device with a specific endpoint;
   validate the pinned public key;
   store the pinned public key on the computing device;
   receive, from an endpoint device, an endpoint certificate issued by a certificate authority, wherein the endpoint certificate includes an endpoint public key; and
   validate the endpoint certificate by determining that the endpoint public key matches the pinned public key stored on the computing device.

12. The non-transitory computer readable medium of claim 11, wherein the machine readable instructions, when executed by the processor, further cause the computing device to at least obtain a signature of the pinned public key from the blockchain.

13. The non-transitory computer readable medium of claim 12, wherein a signing public key is stored on the computing device and wherein the machine readable instructions that validate the pinned public key, when executed by the processor, further cause the computing device to at least perform a signature check using the pinned public key, the signature of the pinned public key, and the signing public key.

14. The non-transitory computer readable medium of claim 11, wherein the machine readable instructions that obtain the pinned public key from the blockchain, when executed by the processor, further cause the computing device to at least obtain the pinned public key based on a predefined wallet identifier.

15. The non-transitory computer readable medium of claim 14, wherein the machine readable instructions that obtain the pinned public key from the blockchain, when executed by the processor, further cause the computing device to at least execute the smart contract associated with the predefined wallet identifier.

* * * * *